US012631952B2

(12) United States Patent (10) Patent No.: US 12,631,952 B2
Wakabayashi et al. (45) Date of Patent: May 19, 2026

(54) PROJECTOR

(71) Applicant: SEIKO EPSON CORPORATION,
Tokyo (JP)

(72) Inventors: Junichi Wakabayashi, Matsumoto (JP);
Hidefumi Sakata, Azumino (JP); **Eiji
Morikuni, Matsumoto (JP); Takuo
Yoneyama**, Azumino (JP)

(73) Assignee: SEIKO EPSON CORPORATION,
Tokyo (JP)

( * ) Notice: Subject to any disclaimer, the term of this
patent is extended or adjusted under 35
U.S.C. 154(b) by 300 days.

(21) Appl. No.: 18/586,864

(22) Filed: Feb. 26, 2024

(65) Prior Publication Data

US 2024/0288761 A1 Aug. 29, 2024

(30) Foreign Application Priority Data

Feb. 27, 2023 (JP) ................................. 2023-028134

(51) Int. Cl.
*G03B 21/20* (2006.01)
(52) U.S. Cl.
CPC ....... *G03B 21/208* (2013.01); *G03B 21/2006*
(2013.01); *G03B 21/2066* (2013.01)
(58) Field of Classification Search
CPC .............. G03B 21/208; G03B 21/2006; G03B
21/2066; G03B 21/005; G03B 21/2073;
G03B 33/12; G03B 21/206
See application file for complete search history.

(56) References Cited

U.S. PATENT DOCUMENTS

| | | | |
|---|---|---|---|
| 7,159,988 | B2 | 1/2007 | Yatsu et al. |
| 11,385,510 | B1 * | 7/2022 | Guo ................... G03B 21/2073 |
| 2005/0012870 | A1 * | 1/2005 | Hirata .................. H04N 9/3105 |
| | | | 349/8 |
| 2005/0078387 | A1 * | 4/2005 | Maeda ................. H04N 9/3105 |
| | | | 359/833 |
| 2005/0264763 | A1 * | 12/2005 | Osaka .................. G03B 21/005 |
| | | | 353/31 |
| 2005/0271312 | A1 * | 12/2005 | Uchiyama .............. H04N 9/315 |
| | | | 348/E9.027 |

(Continued)

FOREIGN PATENT DOCUMENTS

| | | |
|---|---|---|
| JP | 2005-157153 A | 6/2005 |
| JP | 2005-345767 A | 12/2005 |

(Continued)

*Primary Examiner* — John R Schnurr
(74) *Attorney, Agent, or Firm* — OLIFF PLC

(57) ABSTRACT

A projector includes a separation optical system including a
first dichroic mirror for separating outgoing light into a first
colored light beam as a blue light beam and another colored
light beam, a first light modulation element for modulating
the first colored light beam, a second light modulation
element for modulating the other colored light beam, a
reflecting mirror for reflecting the first colored light beam
from the first dichroic mirror, toward the first light modu-
lation element, a reduction optical system for reducing a
luminous flux width of the first colored light beam modu-
lated by the first light modulation element, and a color
combining prism. The effective area of the first light modu-
lation element is larger than the effective area of the second
light modulation element.

7 Claims, 4 Drawing Sheets

(56)　　　　　References Cited

U.S. PATENT DOCUMENTS

| | | | | |
|---|---|---|---|---|
| 2006/0044518 A1* | 3/2006 | Allen | .................... | G03B 33/12 |
| | | | | 353/30 |
| 2006/0262233 A1* | 11/2006 | Uehara | ................ | G03B 21/006 |
| | | | | 349/5 |
| 2012/0002173 A1* | 1/2012 | Akiyama | ............. | H04N 9/3105 |
| | | | | 353/30 |
| 2012/0229715 A1* | 9/2012 | Okumura | ............. | H04N 9/3105 |
| | | | | 349/5 |
| 2016/0097514 A1* | 4/2016 | Yano | ................. | G03B 21/2026 |
| | | | | 362/293 |
| 2016/0142686 A1* | 5/2016 | Perkins | ................ | G02B 17/006 |
| | | | | 348/758 |
| 2016/0274445 A1* | 9/2016 | Kito | ................... | G03B 21/2053 |
| 2019/0049825 A1* | 2/2019 | Kodama | ............. | G09G 3/3611 |
| 2022/0100074 A1* | 3/2022 | Yasui | ................... | G03B 21/204 |
| 2022/0113611 A1* | 4/2022 | Toriyama | ........... | G03B 21/2066 |
| 2023/0040080 A1* | 2/2023 | Kaneda | ................. | G03B 21/00 |
| 2023/0074488 A1 | 3/2023 | Wakabayashi | | |
| 2023/0251557 A1* | 8/2023 | Ito | ........................ | G03B 21/145 |
| | | | | 353/119 |
| 2024/0094614 A1* | 3/2024 | Kaneda | ................. | G03B 21/00 |
| 2024/0288662 A1* | 8/2024 | Morikuni | .............. | G03B 21/14 |
| 2024/0288759 A1* | 8/2024 | Wakabayashi | ......... | G03B 33/12 |
| 2024/0288760 A1* | 8/2024 | Wakabayashi | ....... | G02B 27/141 |
| 2024/0288762 A1* | 8/2024 | Morikuni | .............. | G03B 21/28 |

FOREIGN PATENT DOCUMENTS

| | | | |
|---|---|---|---|
| JP | 2006-330410 A | | 12/2006 |
| JP | 2022-038106 A | | 3/2022 |
| JP | 2023-037782 A | | 3/2023 |

* cited by examiner

PROJECTOR

The present application is based on, and claims priority from JP Application Serial Number 2023-028134, filed Feb. 27, 2023, the disclosure of which is hereby incorporated by reference herein in its entirety.

BACKGROUND

1. Technical Field

The present disclosure relates to a projector.

2. Related Art

A projector in which liquid crystal in a liquid crystal device is prevented from deteriorating due to light from a light source is described in JP-A-2022-38106 (Document 1). The projector described in Document 1 is provided with a light source, a dichroic mirror for separating the light from the light source into three colored light beams, three transmissive liquid crystal light valves for respectively modulating the three colored light beams thus separated from each other, a cross dichroic prism for combining the light beams modulated by the liquid crystal light valves with each other, and a projection lens for projecting the light thus combined. In the projector described in Document 1, in the three liquid crystal light valves, the liquid crystal light valve for modulating the blue light beam is easier to be deteriorated by the light than other liquid crystal light valves for modulating the red light beam and the green light beam, and therefore, the liquid crystal light valve for modulating the blue light beam is provided with a plurality of liquid crystal reservoirs in a peripheral portion of an effective display area. Thus, since it is possible for the liquid crystal light valve for modulating the blue light beam to make the total amount of the liquid crystal in the liquid crystal light valve larger than in other liquid crystal light valves, it is possible to prevent the liquid crystal from being deteriorated by the light.

In recent years, a brighter projector is desired. However, in the projector described in Document 1, when raising the intensity of the light of the light source in order to make the projector brighter, there is a problem that it is difficult to prevent the deterioration of the liquid crystal in the liquid crystal light valve for modulating the blue light beam.

SUMMARY

In view of the problems described above, a projector according to the present disclosure includes a light source, a separation optical system including a first dichroic mirror configured to separate outgoing light emitted from the light source into a first colored light beam in a first wavelength band including blue light and another colored light beam longer in wavelength band than the first colored light beam, and to reflect the first colored light beam toward a direction perpendicular to an optical axis of the outgoing light, a first light modulation element configured to perform a modulation on the first colored light beam separated by the first dichroic mirror, a second light modulation element configured to perform a modulation on the other colored light beam separated by the first dichroic mirror, a reflecting mirror configured to reflect the first colored light beam separated by the first dichroic mirror, in a perpendicular direction toward the first light modulation element, a reduction optical system having an expansion side imaging plane on which the first light modulation element is disposed, and configured to reduce a luminous flux width of the first colored light beam on a reduction side imaging plane, the first colored light beam being modulated by the first light modulation element, a color combining prism configured to emit a composite light beam obtained by combining the first colored light beam a luminous flux width of which is reduced by the reduction optical system, and the other colored light beam modulated by the second light modulation element with each other, and a projection optical system configured to project the composite light beam emitted from the color combining prism, wherein an effective area of the first light modulation element is larger than an effective area of the second light modulation element, an optical axis of the first light modulation element is parallel to an optical axis of the reduction side imaging plane, an incident direction of the first colored light beam entering the first light modulation element is an opposite direction to an exit direction of the first colored light beam emitted from the reduction side imaging plane, and the reduction side imaging plane is at a position opposed to a first surface part of the color combining prism which the first colored light beam enters.

DESCRIPTION OF EMBODIMENTS

Projectors according to some embodiments of the present disclosure will hereinafter be described with reference to the drawings.

Embodiment 1

Figure 1:
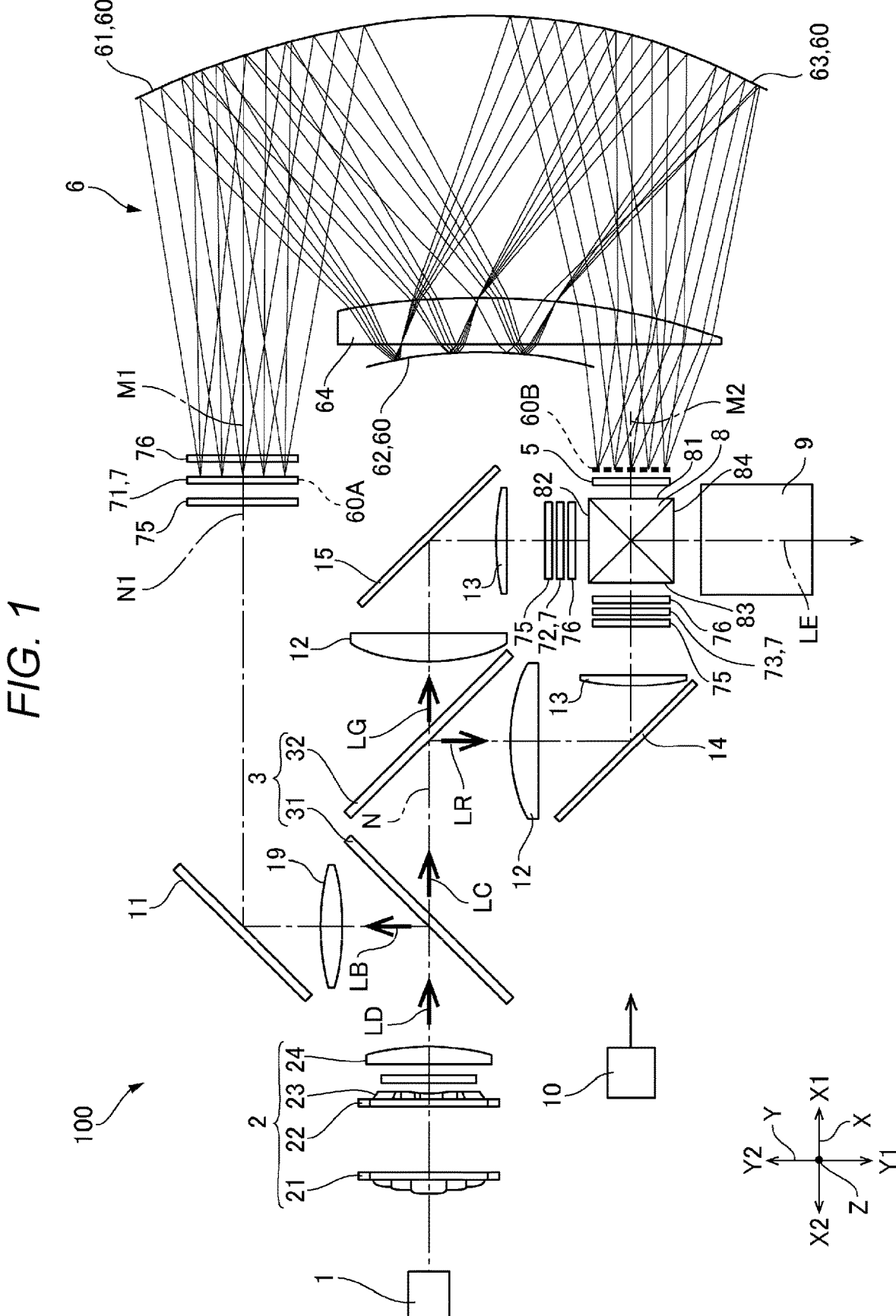
FIG. 1 is a schematic diagram of a relevant part of a projector according to Embodiment 1.

FIG. 1 is a schematic diagram of a relevant part of a projector 100 according to Embodiment 1. As shown in FIG. 1, the projector 100 has a light source 1, an illumination optical system 2 for homogenizing outgoing light from the light source 1, a separation optical system 3 for separating the outgoing light from the illumination optical system 2 into colored light beams, a plurality of light modulation elements 7 for modulating the respective colored light beams separated by the separation optical system 3 to form projection images, a reflecting mirror 11, a reduction optical system 6 for reducing a luminous flux width of the colored light beam modulated one of the light modulation elements 7, a color combining prism 8 for emitting a composite light beam obtained by combining the colored light beams modulated by the light modulation elements 7, a projection optical system 9 for projecting the composite light beam emitted from the color combining prism 8, and a controller 10 for controlling the light modulation elements 7.

Here, in the following description, three axes perpendicular to each other are defined as an X axis, a Y axis, and a Z axis for the sake of convenience. Further, a direction along a first optical axis N of the separation optical system 3 is defined as an X-axis direction. In the X-axis direction, a direction in which the outgoing light from the illumination optical system 2 is emitted is defined as a first direction X1, and an opposite direction to the first direction X1 is defined as a second direction X2. In the Y-axis direction, a direction in which the composite light beam is emitted from the color combining prism 8 is defined as a third direction Y1, and an opposite direction to the third direction Y1 is defined as a fourth direction Y2.

The light source 1 is formed of, for example, a super-high pressure mercury lamp or a solid-state light source. In the present embodiment, the light source 1 emits white light as outgoing light LD.

The illumination optical system 2 is provided with a multi-lens 21, a polarization beam splitter 22, a multi-lens 23, and a relay lens 24. The multi-lens 21 divides the outgoing light LD from the light source 1 into a plurality of parts. The polarization beam splitter 22 converts a polarization direction of the outgoing light LD emitted from the multi-lens 21. The multi-lens 23 converges the outgoing light LD emitted from the polarization beam splitter 22 on the vicinity of the relay lens 24. The relay lens 24 enlarges the outgoing light LD which enters the relay lens 24 from the multi-lens 23, and then emits the result toward the separation optical system 3.

The separation optical system 3 is provided with a first dichroic mirror 31 and a second dichroic mirror 32 in this order toward the first direction X1. The first dichroic mirror 31 and the second dichroic mirror 32 are arranged along the first optical axis N of the separation optical system 3. The optical axis of the outgoing light LD from the illumination optical system 2 coincides with the first optical axis N.

The first dichroic mirror 31 separates the outgoing light LD into a first colored light beam LB and another colored light beam LC. The first dichroic mirror 31 reflects the first colored light beam LB toward the fourth direction Y2, and transmits the other colored light beam LC toward the first direction X1. The second dichroic mirror 32 separates the other colored light beam LC into a second colored light beam LG and a third colored light beam LR. The second dichroic mirror 32 reflects the third colored light beam LR toward the third direction Y1, and transmits the second colored light beam LG toward the first direction X1. In the present embodiment, the first colored light beam LB is in a first wavelength band including blue. The second colored light beam LG is in a second wavelength band including green. The third colored light beam LR is in a third wavelength band including red. The first wavelength band is in a range of, for example, 420 nm through 500 nm. The second wavelength band is in a range of, for example, 500 nm through 600 nm. The third wavelength band is in a range of, for example, 600 nm through 680 nm. The wavelength band of the other colored light beam LC is in a range of, for example, 500 nm through 680 nm.

Here, at the third direction Y1 side of the second dichroic mirror 32, there is disposed a reflecting mirror 14 which reflects the third colored light beam LR separated by the second dichroic mirror 32, toward the first direction X1. At the first direction X1 side of the second dichroic mirror 32, there is disposed a reflecting mirror 15 which reflects the second colored light beam LG separated by the second dichroic mirror 32, toward the third direction Y1. Between the second dichroic mirror 32 and the reflecting mirror 14, and between the second dichroic mirror 32 and the reflecting mirror 15, there are arranged lenses 12, respectively. At the first direction X1 side of the reflecting mirror 14 and the third direction Y1 side of the reflecting mirror 15, there are arranged lenses 13, respectively. The lenses 12 and the lenses 13 each converge the second colored light beam LG and the third colored light beam LR separated by the separation optical system 3 on the vicinity of the light modulation elements 7, respectively.

The reflecting mirror 11 is disposed at the fourth direction Y2 side of the first dichroic mirror 31. The reflecting mirror 11 reflects the first colored light beam LB separated by the first dichroic mirror 31, toward the first direction X1. Here, the projector 100 is provided with a relay lens 19 between the reflecting mirror 11 and the first dichroic mirror 31. The relay lens 19 adjusts the imaging position of the first colored light beam LB so that a first light modulation element 71 is homogenously irradiated with the first colored light beam LB from the first dichroic mirror 31. In the present embodiment, the relay lens 19 includes a single lens. It should be noted that the relay lens 19 can be configured with a plurality of lenses.

The light modulation elements 7 are each a liquid crystal panel. The light modulation elements 7 includes the first light modulation element 71 for performing the modulation on the first colored light beam LB, a third light modulation element 72 for performing the modulation on the second colored light beam LG, and a fourth light modulation element 73 for performing the modulation on the third colored light beam LR. The first light modulation element 71, the third light modulation element 72, and the fourth light modulation element 73 are each provided with an incidence side polarization plate 75 and an exit side polarization plate 76. It should be noted that the third light modulation element 72 and the fourth light modulation element 73 each correspond to a "second light modulation element" in the present disclosure.

The first light modulation element 71 is disposed at the first direction X1 side of the first dichroic mirror 31. The optical axis N1 of the first light modulation element 71 extends in a direction along the X axis. The optical axis N1 of the first light modulation element 71 is parallel to the first optical axis N of the separation optical system 3.

The third light modulation element 72 is disposed at a position opposed to a second surface part 82 of the color combining prism 8. The fourth light modulation element 73 is disposed at a position opposed to a third surface part 83 of the color combining prism 8.

The effective area of the first light modulation element 71 is larger than the effective area of the third light modulation element 72 and the effective area of the fourth light modulation element 73. A diagonal dimension of the effective area (the effective display area) in the light modulation element in the present embodiment is 1.03 inch in the liquid crystal panel as the first light modulation element 71, and is 0.67 inch in the liquid crystal panels as the third light modulation element 72 and the fourth light modulation element 73. In the present embodiment, in the first light modulation element 71, the third light modulation element 72, and the fourth light modulation element 73, the display resolution is set to, for example, WUXGA (1920 pixels in the horizontal direction, 1200 pixels in the vertical direction).

The first light modulation element 71 is disposed on an expansion side imaging plane 60A of the reduction optical system 6, and the reduction optical system 6 reduces the luminous flux width of the first colored light beam LB modulated by the first light modulation element 71 on a reduction side imaging plane 60B. In the present embodiment, the reduction optical system 6 reduces the luminous flux width of 1.03 inch of the first colored light beam LB modulated by the first light modulation element 71 into the luminous flux width of 0.67 inch on the reduction side imaging plane 60B. The optical axis N1 of the first light modulation element 71 and an optical axis M1 of the expansion side imaging plane 60A coincide with each other. The reduction side imaging plane 60B is disposed at a position opposed to the first surface part 81 of the color combining prism 8. The distance between the reduction side imaging plane 60B and the first surface part 81 of the color combining prism 8 is the same as the distance between the third light modulation element 72 and the second surface part 82 of the color combining prism 8. Further, the distance between the reduction side imaging plane 60B and the first surface part 81 of the color combining prism 8 is the same as the distance between the fourth light modulation element 73 and the third surface part 83 of the color combining prism 8.

Here, the projector 100 has a polarization plate 5 arranged between the reduction side imaging plane 60B and the first surface part 81. The polarization plate 5 and the exit side polarization plate 76 of the first light modulation element 71 respectively transmit linearly-polarized components the same in direction out of the polarization components included in the first colored light beam LB. In other words, when the exit side polarization plate 76 of the first light modulation element 71 transmits S-polarized light of the first colored light beam LB, the polarization plate 5 transmits the S-polarized light, and when the exit side polarization plate 76 transmits P-polarized light of the first colored light beam LB, the polarization plate 5 transmits the P-polarized light.

The color combining prism 8 is provided with the first surface part 81 which the first colored light beam LB enters, the second surface part 82 which the second colored light beam LG enters, and the third surface part 83 which the third colored light beam LR enters, and a fourth surface part 84 from which the composite light beam LE is emitted. The first surface part 81 and the third surface part 83 are opposed in the X-axis direction to each other. The second surface part 82 and the fourth surface part are opposed in the Y-axis direction to each other. The color combining prism 8 emits the composite light beam LE obtained by combining the first colored light beam LB the luminous flux width of which is reduced by the reduction optical system 6, the second colored light beam LG modulated by the third light modulation element 72, and the third colored light beam LR modulated by the fourth light modulation element 73 with each other, from the fourth surface part 84 toward the third direction Y1. Here, the luminous flux width of the first colored light beam LB entering the first surface part 81 of the color combining prism 8 is the same as the luminous flux width of the second colored light beam LG entering the second surface part 82 of the color combining prism 8, and the luminous flux width of the third colored light beam LR entering the third surface part 83 of the color combining prism 8.

The projection optical system 9 projects the composite light beam LE emitted from the color combining prism 8 on a screen. The projection optical system 9 is provided with a plurality of lenses. The controller 10 makes the light modulation elements 7 operate based on an external image signal such as a video signal.

Details of Reduction Optical System

As shown in FIG. 1, the reduction optical system 6 is provided with a plurality of reflecting surfaces 60 having power, and a lens 64. More specifically, the reduction optical system 6 is provided with a first reflecting surface 61 having positive power, the lens 64, a second reflecting surface 62 having negative power, and a third reflecting surface 63 having positive power. The first reflecting surface 61 is provided with a concave shape. The second reflecting surface 62 is provided with a convex shape. The third reflecting surface 63 is provided with a concave shape.

The first colored light beam LB having reached the first reflecting surface 61 from the first light modulation element 71 is reflected toward the second direction X2 and the third direction Y1. The first colored light beam LB having been reflected by the first reflecting surface 61 is transmitted through the lens 64, and then reaches the second reflecting surface 62. The first colored light beam LB having reached the second reflecting surface 62 is reflected toward the first direction X1 and the third direction Y1. The first colored light beam LB having been reflected by the second reflecting surface 62 is transmitted through the lens 64, and then reaches the third reflecting surface 63. The first colored light beam LB having reached the third reflecting surface 63 is reflected toward the second direction X2. The first colored light beam LB having been reflected by the third reflecting surface 63 is transmitted through the lens 64, and then reaches the reduction side imaging plane 60B.

The optical axis M1 of the expansion side imaging plane 60A and an optical axis M2 of the reduction side imaging plane 60B are parallel to each other. In other words, the optical axis N1 of the first light modulation element 71 is parallel to the optical axis M2 of the reduction side imaging plane 60B.

The incident direction of the first colored light beam LB which enters the expansion side imaging plane 60A is the first direction X1. The exit direction of the first colored light beam LB which is emitted from the reduction side imaging plane 60B is the second direction X2. In other words, the incident direction of the first colored light beam LB entering the first light modulation element 71 is an opposite direction to the exit direction of the first colored light beam LB emitted from the reduction side imaging plane 60B.

The expansion side imaging plane 60A and the reduction side imaging plane 60B are located at the same side, namely the first direction X1 side, with respect to the first surface part 81 of the color combining prism 8. In other words, the first light modulation element 71 and the reduction side imaging plane 60B are located at the same side, namely the first direction X1 side, with respect to the first surface part 81 of the color combining prism 8.

Both sides of the reduction optical system 6, namely the expansion side of the first reflecting surface 61, and the reduction side of the lens 64, are each telecentric. The expression that the expansion side of the first reflecting surface 61 is telecentric means the state in which a central ray of the beams passing between the first reflecting surface 61 and the expansion side imaging plane 60A is made parallel to the optical axis M1, or made substantially parallel to the optical axis M1. The expression that the reduction side of the lens 64 is telecentric means the state in which a central ray of the beams passing between the lens 64 and the reduction side imaging plane 60B is made parallel to the optical axis M2, or made substantially parallel to the optical axis M2. In the present embodiment, angles between the central ray of the beams and the optical axes M1, M2 are each within ±5°.

Functions and Advantages

The projector 100 according to the present embodiment includes the light source 1, the separation optical system 3 provided with the first dichroic mirror 31 for separating the outgoing light LD emitted from the light source 1 into the first colored light beam LB in the first wavelength band including the blue light and the other colored light beam LC longer in wavelength band than the first colored light beam LB, and at the same time, reflecting the first colored light beam LB toward the Y-axis direction perpendicular to the optical axis of the outgoing light LD, the first light modulation element 71 for performing the modulation on the first colored light beam LB separated by the first dichroic mirror 31, the second light modulation element for performing the modulation on the other colored light beam LC separated by the first dichroic mirror 31, the reflecting mirror 11 for reflecting the first colored light beam LB separated by the first dichroic mirror 31, toward the first light modulation element 71 perpendicularly in the X-axis direction, the reduction optical system 6 having the expansion side imaging plane 60A on which the first light modulation element 71 is disposed, and reducing the luminous flux width of the first colored light beam LB modulated by the first light modulation element 71 on the reduction side imaging plane 60B, the color combining prism 8 for emitting the composite light beam LE obtained by combining the first colored light beam LB the luminous flux width of which is reduced by the reduction optical system 6, and the other colored light beam LC modulated by the second light modulation element with each other, and the projection optical system 9 for projecting the composite light beam LE emitted from the color combining prism 8. The effective area of the first light modulation element 71 is larger than the effective area of the second light modulation element. The optical axis N1 of the first light modulation element 71 is parallel to the optical axis M2 of the reduction side imaging plane 60B. The incident direction of the first colored light beam LB entering the first light modulation element 71 is an opposite direction to the exit direction of the first colored light beam LB emitted from the reduction side imaging plane 60B. The reduction side imaging plane 60B is at a position opposed to the first surface part 81 of the color combining prism 8.

According to the present embodiment, since the effective area of the first light modulation element 71 is larger than the effective area of the second light modulation element, it is possible to make the illuminance of the first light modulation element 71 irradiated lower than the illuminance of the second light modulation element. Thus, it is possible to prevent the liquid crystal of the first light modulation element 71 from being deteriorated by the light even when making the light source 1 brighter.

Further, since it is possible for the reduction optical system 6 to reduce the luminous flux width of the first colored light beam LB modulated by the first light modulation element 71 on the reduction side imaging plane 60B, even when the effective area of the first light modulation element 71 is larger than the effective area of the third light modulation element 72, it is possible to make the luminous flux widths of the respective colored light beams entering the color combining prism 8 the same in size.

Further, since the reduction optical system 6 emits the first colored light beam LB from the reduction side imaging plane 60B while bending the first colored light beam LB having entered the expansion side imaging plane 60A by 180°, it is possible to make the whole of the projector compact compared to when the reduction optical system 6 does not bend the first colored light beam LB.

The projector 100 according to the present embodiment has the polarization plate 5 arranged between the reduction side imaging plane 60B and the first surface part 81. Therefore, even when the polarization direction of the first colored light beam LB is disturbed when the first colored light beam LB emitted from the first light modulation element 71 passes through the reduction optical system 6, it is possible for the polarization plate 5 to compensate the polarization direction of the first colored light beam LB. Thus, it is possible to prevent the contrast of the first colored light beam LB entering the color combining prism 8 from being lowered.

The projector 100 according to the present embodiment has the relay lens 19 arranged between the first dichroic mirror 31 and the reflecting mirror 11. The relay lens 19 adjusts the imaging position of the first colored light beam LB from the first dichroic mirror 31. Thus, it is possible to homogenously irradiate the first light modulation element 71 with the first colored light beam LB from the first dichroic mirror 31.

The separation optical system 3 is provided with the second dichroic mirror 32 for separating the other colored light beam LC, which has been transmitted by the first dichroic mirror 31 toward the first direction X1, into the second colored light beam LG in the second wavelength band including green, and the third colored light beam LR in the third wavelength band including red. The second light modulation element is provided with the third light modulation element 72 for performing the modulation on the second colored light beam LG separated by the second dichroic mirror 32, and the fourth light modulation element 73 for performing the modulation on the third colored light beam separated by the second dichroic mirror. The color combining prism 8 emits the composite light beam LE obtained by combining the first colored light beam LB the luminous flux width of which is reduced by the reduction optical system 6, the second colored light beam LG modulated by the third light modulation element 72, and the third colored light beam LR modulated by the fourth light modulation element 73 with each other. In this way, it is possible for the projector 100 to project the composite light beam LE as a full-color light beam.

The luminous flux width of the first colored light beam LB entering the first surface part 81 of the color combining prism 8 is the same as the luminous flux width of the second colored light beam LG entering the second surface part 82 of the color combining prism 8, and the luminous flux width of the third colored light beam LR entering the third surface part 83 of the color combining prism 8. Therefore, it is easy for the color combining prism 8 to combine the colored light beams with each other to form the single composite light beam LE.

The reduction optical system 6 is provided with the plurality of reflecting surfaces 60 having power. The both sides of the reduction optical system 6 are each telecentric. Therefore, compared to a configuration in which the both sides of the reduction optical system 6 are not telecentric, the installation accuracy to the first light modulation element 71 is not so severe when incorporating the reduction optical system 6 into the projector 100. Further, since the first colored light beam LB proceeding from the reduction side imaging plane 60B toward the color combining prism 8 becomes a parallel light beam, it is easy to prevent the variety of aberrations to be generated in the reduction optical system 6 form being generated.

Further, since the reduction optical system 6 is configured with the plurality of reflecting surfaces 60, it becomes possible to use a light path of the reduction optical system 6 as a blast duct for feeding air. Thus, it becomes easy to cool the light modulation elements 7, and thus, it is possible to prevent the light modulation elements 7 from deteriorating. Further, when the light path of the reduction optical system 6 is used as the blast duct for feeding air, it becomes easy to cool the reflecting surfaces 60, and therefore, it is possible to prevent the optical performance of the reflecting surfaces 60 from degrading due to thermal expansion.

Embodiment 2

Figure 2:
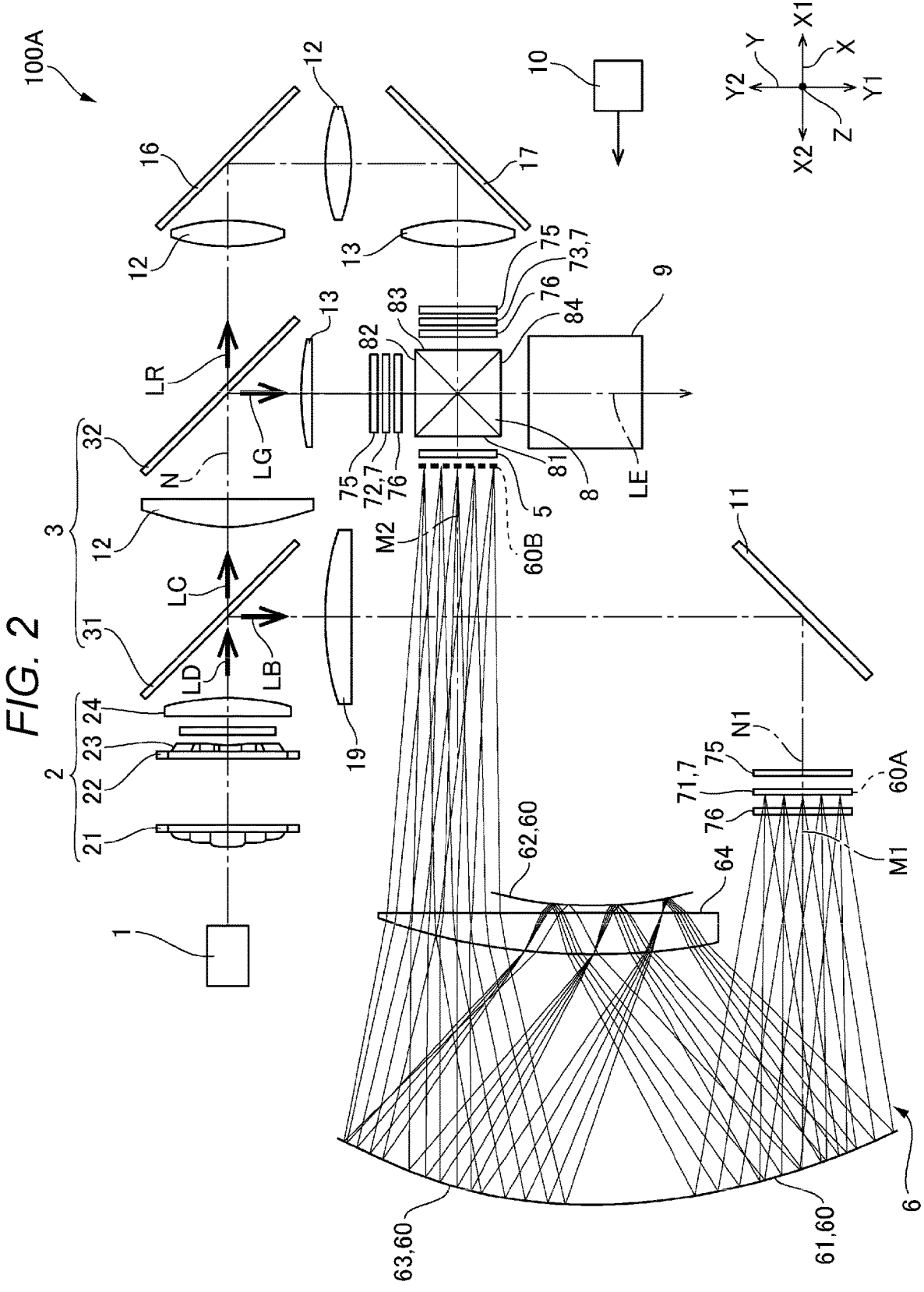
FIG. 2 is a schematic diagram of a relevant part of a projector according to Embodiment 2.

FIG. 2 is a schematic diagram of a relevant part of a projector 100A according to Embodiment 2. The projector 100A according to Embodiment 2 is different in position where the reduction optical system 6 is disposed from the projector 100 according to Embodiment 1. Therefore, in Embodiment 2, the same components as in Embodiment 1 are denoted by the same reference symbols to omit the description thereof in some cases.

The separation optical system 3 is provided with a first dichroic mirror 31 and a second dichroic mirror 32 in this order toward the first direction X1. The first dichroic mirror 31 and the second dichroic mirror 32 are arranged along the first optical axis N of the separation optical system 3. The first dichroic mirror 31 separates the outgoing light LD into the first colored light beam LB and the other colored light beam LC.

The first dichroic mirror 31 reflects the first colored light beam LB toward the third direction Y1, and transmits the other colored light beam LC toward the first direction X1. The second dichroic mirror 32 separates the other colored light beam LC into the second colored light beam LG and the third colored light beam LR. The second dichroic mirror 32 reflects the second colored light beam LG toward the third direction Y1, and transmits the third colored light beam LR toward the first direction X1. In the present embodiment, the first colored light beam LB is in the first wavelength band including blue. The second colored light beam LG is in the second wavelength band including green. The third colored light beam LR is in the third wavelength band including red. The first wavelength band is in a range of, for example, 420 nm through 500 nm. The second wavelength band is in a range of, for example, 500 nm through 600 nm. The third wavelength band is in a range of, for example, 600 nm through 680 nm. The wavelength band of the other colored light beam LC is in a range of, for example, 500 nm through 680 nm.

Here, at the first direction X1 side of the second dichroic mirror 32, there is disposed a reflecting mirror 16 which reflects the third colored light beam LR separated by the second dichroic mirror 32, toward the third direction Y1. At the third direction Y1 side of the reflecting mirror 16, there is disposed a reflecting mirror 17 which reflects the third colored light beam LR having been reflected by the reflecting mirror 16, toward the second direction X2. Between the first dichroic mirror 31 and the second dichroic mirror 32, between the second dichroic mirror 32 and the reflecting mirror 16, and between the reflecting mirror 16 and the reflecting mirror 17, there are arranged lenses 12, respectively. At the third direction Y1 side of the second dichroic mirror 32, and the second direction X2 side of the reflecting mirror, there are arranged lenses 13, respectively. The lenses 12 and the lenses 13 each converge the second colored light beam LG and the third colored light beam LR separated by the separation optical system 3 on the vicinity of the light modulation elements 7, respectively.

The reflecting mirror 11 is disposed at the third direction Y1 side of the first dichroic mirror 31. The reflecting mirror 11 reflects the first colored light beam LB separated by the first dichroic mirror 31 toward the third direction Y1, toward the second direction X2. Here, the projector 100A is provided with the relay lens 19 between the reflecting mirror 11 and the first dichroic mirror 31. In the present embodiment, the relay lens 19 includes a single lens. It should be noted that the relay lens 19 can be configured with a plurality of lenses.

The first light modulation element 71 is disposed at the first direction X1 side of the first dichroic mirror 31. The optical axis N1 of the first light modulation element 71 extends in a direction along the X axis. The optical axis N1 of the first light modulation element 71 is parallel to the first optical axis N of the separation optical system 3.

The third light modulation element 72 is disposed at a position opposed to the second surface part 82 of the color combining prism 8. The fourth light modulation element 73 is disposed at a position opposed to the third surface part 83 of the color combining prism 8.

The effective area of the first light modulation element 71 is larger than the effective area of the third light modulation element 72 and the effective area of the fourth light modulation element 73. A diagonal dimension of the effective area (the effective display area) in the light modulation element in the present embodiment is 1.03 inch in the liquid crystal panel as the first light modulation element 71, and is 0.67 inch in the liquid crystal panels as the third light modulation element 72 and the fourth light modulation element 73. In the present embodiment, in the first light modulation element 71, the third light modulation element 72, and the fourth light modulation element 73, the display resolution is set to, for example, WUXGA (1920 pixels in the horizontal direction, 1200 pixels in the vertical direction).

The first light modulation element 71 is disposed on an expansion side imaging plane 60A of the reduction optical system 6, and the reduction optical system 6 reduces the luminous flux width of the first colored light beam LB modulated by the first light modulation element 71 on the reduction side imaging plane 60B. The optical axis N1 of the first light modulation element 71 and the optical axis M1 of the expansion side imaging plane 60A coincide with each other. In the present embodiment, the reduction optical system 6 reduces the luminous flux width of 1.03 inch of the first colored light beam LB modulated by the first light modulation element 71 into the luminous flux width of 0.67 inch on the reduction side imaging plane 60B. The reduction side imaging plane 60B is disposed at a position opposed to the first surface part 81 of the color combining prism 8.

Here, the projector 100A has the polarization plate 5 arranged between the reduction side imaging plane 60B and the first surface part 81. The polarization plate 5 and the exit side polarization plate 76 of the first light modulation element 71 respectively transmit linearly-polarized components the same in direction out of the polarization components included in the first colored light beam LB.

The luminous flux width of the first colored light beam LB entering the first surface part 81 of the color combining prism 8 is the same as the luminous flux width of the second colored light beam LG entering the second surface part 82 of the color combining prism 8, and the luminous flux width of the third colored light beam LR entering the third surface part 83 of the color combining prism 8.

Details of Reduction Optical System

As shown in FIG. 2, the reduction optical system 6 is provided with the first reflecting surface 61 having positive power, the lens 64, the second reflecting surface 62 having negative power, and the third reflecting surface 63 having positive power. The first reflecting surface 61 is provided with a concave shape. The second reflecting surface 62 is provided with a convex shape. The third reflecting surface 63 is provided with a concave shape.

The first colored light beam LB having reached the first reflecting surface 61 from the first light modulation element 71 is reflected toward the first direction X1 and the fourth direction Y2. The first colored light beam LB having been reflected by the first reflecting surface 61 is transmitted through the lens 64, and then reaches the second reflecting surface 62. The first colored light beam LB having reached the second reflecting surface 62 is reflected toward the second direction X2 and the fourth direction Y2. The first colored light beam LB having been reflected by the second reflecting surface 62 is transmitted through the lens 64, and then reaches the third reflecting surface 63. The first colored light beam LB having reached the third reflecting surface 63 is reflected toward the first direction X1. The first colored light beam LB having been reflected by the third reflecting surface 63 is transmitted through the lens 64, and then reaches the reduction side imaging plane 60B.

The optical axis M1 of the expansion side imaging plane 60A and the optical axis M2 of the reduction side imaging plane 60B are parallel to each other. In other words, the optical axis N1 of the first light modulation element 71 is parallel to the optical axis M2 of the reduction side imaging plane 60B.

The incident direction of the first colored light beam LB which enters the expansion side imaging plane 60A is the second direction X2. The exit direction of the first colored light beam LB which is emitted from the reduction side imaging plane 60B is the first direction X1. In other words, the incident direction of the first colored light beam LB entering the first light modulation element 71 is an opposite direction to the exit direction of the first colored light beam LB emitted from the reduction side imaging plane 60B.

The expansion side imaging plane 60A and the reduction side imaging plane 60B are located at the same side, namely the second direction X2 side, with respect to the first surface part 81 of the color combining prism 8. In other words, the first light modulation element 71 and the reduction side imaging plane 60B are located at the same side, namely the second direction X2 side, with respect to the first surface part 81 of the color combining prism 8.

The both sides of the reduction optical system 6, namely the expansion side of the first reflecting surface 61, and the reduction side of the lens 64, are each telecentric.

Functions and Advantages

Even when arranging the reduction optical system 6 as described in Embodiment 2, it is possible for the projector 100A to obtain substantially the same functions and advantages as those obtained in Embodiment 1.

Embodiment 3

Figure 3:
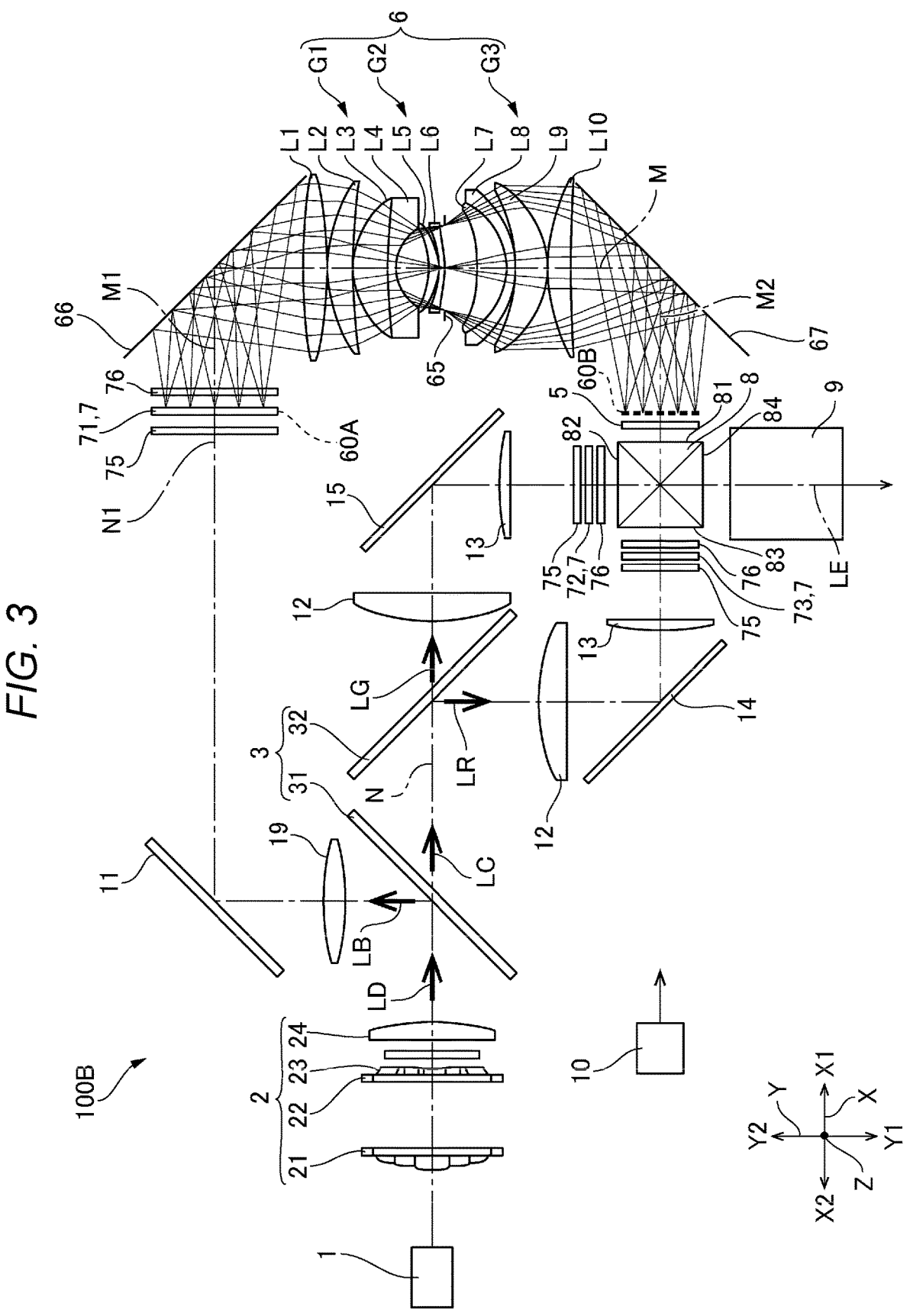
FIG. 3 is a schematic diagram of a relevant part of a projector according to Embodiment 3.

FIG. 3 is a schematic diagram of a relevant part of a projector 100B according to Embodiment 3. The projector 100B according to Embodiment 3 is different in configuration of the reduction optical system 6 from the projector 100 according to Embodiment 1. Therefore, in Embodiment 3, the same components as in Embodiment 1 are denoted by the same reference symbols to omit the description thereof in some cases.

As shown in FIG. 3, the reduction optical system 6 is provided with the first lens group G1, the second lens group G2, and the third lens group G3 in this order from the expansion side toward the reduction side, wherein the first lens group G1 is formed of a plurality of lenses, and has positive power, the second lens group G2 has negative power, and has a single lens or two lenses at least one of which is a lens having negative power, and the third lens group G3 is formed of a plurality of lenses, and has positive power. The reduction optical system 6 is provided with a diaphragm 65 between the second lens group G2 and the third lens group G3. The first lens group G1, the second lens group G2, and the third lens group G3 are arranged along a second optical axis M of the reduction optical system 6.

The number of the lenses of the first lens group G1 and the number of the lenses of the third lens group G3 are the same as each other. More specifically, the first lens group G1 includes four lenses, namely lenses L1 through L4. The third lens group G3 includes four lenses, namely lenses L7 through L10.

The second lens group G2 includes two lenses, namely a lens L5 and a lens L6. At least one of the lens L5 and the lens L6 is the lens having negative power.

The reduction optical system 6 is provided with a first reflecting mirror 66 for reflecting the first colored light beam LB modulated by the first light modulation element 71, toward the third direction Y1, and a second reflecting mirror 67 for reflecting the first colored light beam LB having been emitted from the lens L10, toward the second direction X2. The first reflecting mirror 66 is disposed at the fourth direction Y2 side of the lens L1. The second reflecting mirror 67 is disposed at the third direction Y1 side of the lens L10.

The first colored light beam LB having reached the first reflecting mirror 66 from the first light modulation element 71 is reflected toward the third direction Y1. The first colored light beam LB having been reflected by the first reflecting mirror 66 is transmitted through the first lens group G1, the second lens group G2, and the third lens group G3, and then reaches the second reflecting mirror 67. The first colored light beam LB having reached the second reflecting mirror 67 is reflected toward the second direction X2. The first colored light beam LB having been reflected by the second reflecting mirror 67 reaches the reduction side imaging plane 60B.

The optical axis M1 of the expansion side imaging plane 60A and the optical axis M2 of the reduction side imaging plane 60B are parallel to each other. In other words, the optical axis N1 of the first light modulation element 71 is parallel to the optical axis M2 of the reduction side imaging plane 60B.

The incident direction of the first colored light beam LB which enters the expansion side imaging plane 60A is the first direction X1. The exit direction of the first colored light beam LB which is emitted from the reduction side imaging plane 60B is the second direction X2. In other words, the incident direction of the first colored light beam LB entering the first light modulation element 71 is an opposite direction to the exit direction of the first colored light beam LB emitted from the reduction side imaging plane 60B.

The expansion side imaging plane 60A and the reduction side imaging plane 60B are located at the same side, namely the first direction X1 side, with respect to the first surface part 81 of the color combining prism 8. In other words, the first light modulation element 71 and the reduction side imaging plane 60B are located at the same side, namely the first direction X1 side, with respect to the first surface part 81 of the color combining prism 8.

The both sides of the reduction optical system 6, namely the expansion side of the first reflecting surface 66, and the reduction side of the second mirror 67, are each telecentric.

Functions and Advantages

In the present embodiment, the reduction optical system 6 is provided with the first lens group G1, the second lens group G2, and the third lens group G3 in this order from the expansion side toward the reduction side, wherein the first lens group G1 is formed of a plurality of lenses, and has positive power, the second lens group G2 has negative power, and has two lenses at least one of which is a lens having negative power, and the third lens group G3 is formed of a plurality of lenses, and has positive power. The both sides of the reduction optical system 6 are each telecentric. Therefore, since the first lens group G1 and the third lens group G3 located across the second lens group G2 from each other are the same in the number of lenses, it is possible to cancel out a variety of aberrations generated in the first lens group G1 with the third lens group G3. Further, compared to the configuration in which the both sides of the reduction optical system 6 are not telecentric, the installation accuracy to the first light modulation element 71 is not so severe when incorporating the reduction optical system 6 into the projector 100B. Further, since the first colored light beam LB proceeding from the reduction side imaging plane 60B toward the color combining prism 8 becomes a parallel light beam, it is easy to prevent the variety of aberrations to be generated in the reduction optical system 6 form being generated.

Further, even when adopting the reduction optical system 6 as described in Embodiment 3, it is possible for the projector 100B to obtain substantially the same functions and advantages as those obtained in Embodiment 1.

Embodiment 4

Figure 4:
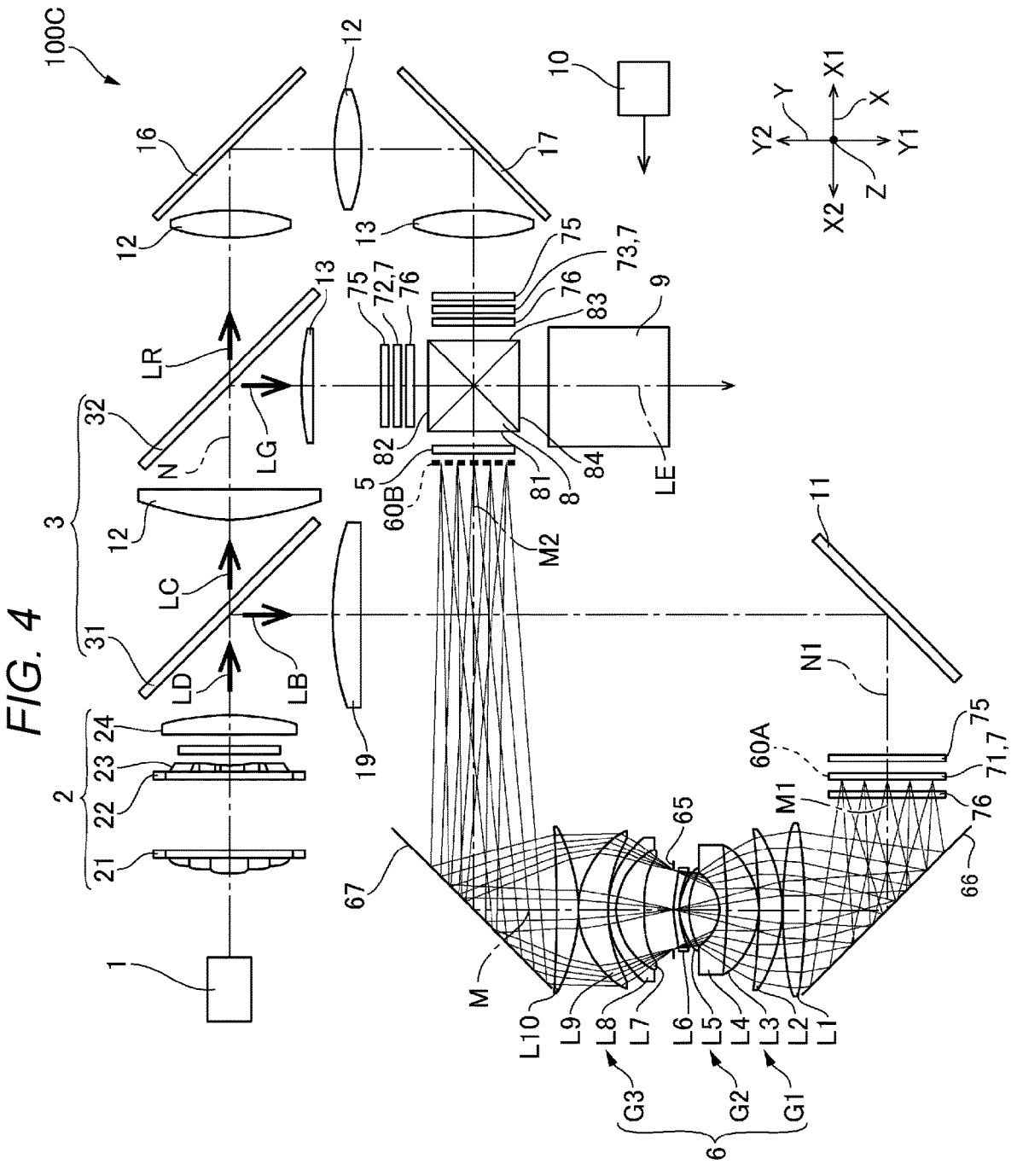
FIG. 4 is a schematic diagram of a relevant part of a projector according to Embodiment 4.

FIG. 4 is a schematic diagram of a relevant part of a projector 100C according to Embodiment 4. The projector 100C according to Embodiment 4 is different from the projector 100A according to Embodiment 2 in the point that the configuration of the reduction optical system 6 is the same as the configuration thereof in Embodiment 3. Therefore, in Embodiment 4, the same components as in Embodiment 1 are denoted by the same reference symbols to omit the description thereof in some cases.

As shown in FIG. 4, the reduction optical system 6 is provided with the first lens group G1, the second lens group G2, and the third lens group G3 in this order from the expansion side toward the reduction side, wherein the first lens group G1 is formed of a plurality of lenses, and has positive power, the second lens group G2 has negative power, and has a single lens or two lenses at least one of which is a lens having negative power, and the third lens group G3 is formed of a plurality of lenses, and has positive power. The reduction optical system 6 is provided with the diaphragm 65 between the second lens group G2 and the third lens group G3. The first lens group G1, the second lens group G2, and the third lens group G3 are arranged along the second optical axis M of the reduction optical system 6.

The number of the lenses of the first lens group G1 and the number of the lenses of the third lens group G3 are the same as each other. More specifically, the first lens group G1 includes the four lenses, namely the lenses L1 through L4. The third lens group G3 includes the four lenses, namely the lenses L7 through L10.

The second lens group G2 includes the two lenses, namely the lens L5 and the lens L6. At least one of the lens L5 and the lens L6 is the lens having negative power.

The reduction optical system 6 is provided with the first reflecting mirror 66 for reflecting the first colored light beam LB modulated by the first light modulation element 71, toward the fourth direction Y2, and the second reflecting mirror 67 for reflecting the first colored light beam LB having been emitted from the lens L10, toward the first direction X1. The first reflecting mirror 66 is disposed at the third direction Y1 side of the lens L1. The second reflecting mirror 67 is disposed at the fourth direction Y2 side of the lens L10.

The first colored light beam LB having reached the first reflecting mirror 66 from the first light modulation element 71 is reflected toward the fourth direction Y2. The first colored light beam LB having been reflected by the first reflecting mirror 66 is transmitted through the first lens group G1, the second lens group G2, and the third lens group G3, and then reaches the second reflecting mirror 67. The first colored light beam LB having reached the second reflecting mirror 67 is reflected toward the first direction X1. The first colored light beam LB having been reflected by the second reflecting mirror 67 reaches the reduction side imaging plane 60B.

The optical axis M1 of the expansion side imaging plane 60A and the optical axis M2 of the reduction side imaging plane 60B are parallel to each other. In other words, the optical axis N1 of the first light modulation element 71 is parallel to the optical axis M2 of the reduction side imaging plane 60B.

The incident direction of the first colored light beam LB which enters the expansion side imaging plane 60A is the second direction X2. The exit direction of the first colored light beam LB which is emitted from the reduction side imaging plane 60B is the first direction X1. In other words, the incident direction of the first colored light beam LB entering the first light modulation element 71 is an opposite direction to the exit direction of the first colored light beam LB emitted from the reduction side imaging plane 60B.

The expansion side imaging plane 60A and the reduction side imaging plane 60B are located at the same side, namely the second direction X2 side, with respect to the first surface part 81 of the color combining prism 8. In other words, the first light modulation element 71 and the reduction side imaging plane 60B are located at the same side, namely the second direction X2 side, with respect to the first surface part 81 of the color combining prism 8.

The both sides of the reduction optical system 6, namely the expansion side of the first reflecting surface 66, and the reduction side of the second mirror 67, are each telecentric.

Functions and Advantages

Even when arranging the reduction optical system 6 as described in Embodiment 4, it is possible for the projector 100C to obtain substantially the same functions and advantages as those obtained in Embodiment 3.

Conclusion of Present Disclosure

Hereinafter, the conclusion of the present disclosure will supplementarily be noted.

Supplementary Note 1

A projector including a light source, a separation optical system including a first dichroic mirror configured to separate outgoing light emitted from the light source into a first colored light beam in a first wavelength band including blue light and another colored light beam longer in wavelength band than the first colored light beam, and to reflect the first colored light beam toward a direction perpendicular to an optical axis of the outgoing light, a first light modulation element configured to perform a modulation on the first colored light beam separated by the first dichroic mirror, a second light modulation element configured to perform a modulation on the other colored light beam separated by the first dichroic mirror, a reflecting mirror configured to reflect the first colored light beam separated by the first dichroic mirror, in a perpendicular direction toward the first light modulation element, a reduction optical system having an expansion side imaging plane on which the first light modulation element is disposed, and configured to reduce a luminous flux width of the first colored light beam on a reduction side imaging plane, the first colored light beam being modulated by the first light modulation element, a color combining prism configured to emit a composite light beam obtained by combining the first colored light beam a luminous flux width of which is reduced by the reduction optical system, and the other colored light beam modulated by the second light modulation element with each other, and a projection optical system configured to project the composite light beam emitted from the color combining prism, wherein an effective area of the first light modulation element is larger than an effective area of the second light modulation element, an optical axis of the first light modulation element is parallel to an optical axis of the reduction side imaging plane, an incident direction of the first colored light beam entering the first light modulation element is an opposite direction to an exit direction of the first colored light beam emitted from the reduction side imaging plane, and the reduction side imaging plane is at a position opposed to a first surface part of the color combining prism which the first colored light beam enters.

Thus, since the effective area of the first light modulation element is larger than the effective area of the second light modulation element, it is possible to make the illuminance of the first light modulation element irradiated lower than the illuminance of the second light modulation element. As a result, it is possible to prevent the liquid crystal in the first light modulation element from being deteriorated by the light.

Further, since it is possible for the reduction optical system to reduce the luminous flux width of the first colored light beam modulated by the first light modulation element on the reduction side imaging plane, even when the effective area of the first light modulation element is larger than the effective area of the second light modulation element, it is possible to make the luminous flux widths of the respective colored light beams entering the color combining prism the same in size.

Further, since the reduction optical system emits the first colored light beam from the reduction side imaging plane while bending the first colored light beam having entered the expansion side imaging plane, it is possible to make the whole of the projector compact compared to when the reduction optical system does not bend the first colored light beam.

Supplementary Note 2

The projector described in Supplementary Note 1 further including a polarization plate arranged between the reduction side imaging plane and the first surface part.

Thus, it is possible to prevent the contrast of the first colored light beam entering the color combining prism from being lowered.

Supplementary Note 3

The projector described in one of Supplementary Note 1 and Supplementary Note 2 further including a relay lens arranged between the first dichroic mirror and the reflecting mirror.

Thus, since it is possible to adjust the imaging position of the first colored light beam LB from the first dichroic mirror, it is possible to homogenously irradiate the first light modulation element with the first colored light beam from the first dichroic mirror.

Supplementary Note 4

The projector described in any one of Supplementary Note 1 through Supplementary Note 3, wherein the separation optical system includes a second dichroic mirror configured to separate the other colored light beam which is transmitted by the first dichroic mirror toward a first direction of the optical axis, into a second colored light beam in a second wavelength band including green, and a third colored light beam in a third wavelength band including red, the second light modulation element includes a third light modulation element configured to perform a modulation on the second colored light beam separated by the second dichroic mirror, and a fourth light modulation element configured to perform a modulation on the third colored light beam separated by the second dichroic mirror, and the color combining prism is configured to emit a composite light beam obtained by combining the first colored light beam the luminous flux width of which is reduced by the reduction optical system, the second colored light beam modulated by the third light modulation element, and the third colored light beam modulated by the fourth light modulation element with each other.

Thus, it is possible for the projector to project the composite light beam as a full-color light beam.

Supplementary Note 5

The projector described in Supplementary Note 4, wherein the first colored light beam entering the first surface part of the color combining prism, the second colored light beam entering a second surface part of the color combining prism, and the third colored light beam entering a third surface part of the color combining prism are same in luminous flux width as each other.

Thus, it is easy for the color combining prism to combine the colored light beams with each other to form the single composite light beam.

Supplementary Note 6

The projector described in any one of Supplementary Note 1 through Supplementary Note 5, wherein the reduction optical system includes a plurality of reflecting surfaces having power, and both sides of the reduction optical system are each telecentric.

Thus, compared to a configuration in which the both sides of the reduction optical system are not telecentric, the installation accuracy to the first light modulation element is not so severe when incorporating the reduction optical system into the projector. Further, since the first colored light beam proceeding from the reduction side imaging plane toward the color combining prism becomes a parallel light beam, it is easy to prevent the variety of aberrations to be generated in the reduction optical system form being generated.

Supplementary Note 7

The projector described in any one of Supplementary Note 1 through Supplementary Note 5, wherein the reduction optical system includes a first lens group, a second lens group, and a third lens group in this order from an expansion side toward a reduction side, wherein the first lens group is formed of a plurality of lenses, and has positive power, the second lens group has negative power, and has a single lens or two lenses at least one of which is a lens having negative power, and the third lens group is formed of a plurality of lenses, and has positive power, the first lens group and the third lens group are same in number of lenses as each other, and both sides of the reduction optical system are each telecentric.

Thus, since the first lens group and the third lens group located across the second lens group from each other are the same in the number of lenses, it is possible to cancel out a variety of aberrations generated in the first lens group with the third lens group. Further, compared to a configuration in which the both sides of the reduction optical system are not telecentric, the installation accuracy to the first light modulation element is not so severe when incorporating the reduction optical system into the projector. Further, since the first colored light beam proceeding from the reduction side imaging plane toward the color combining prism becomes a parallel light beam, it is easy to prevent the variety of aberrations to be generated in the reduction optical system form being generated.

What is claimed is:
1. A projector comprising:
a light source;
a separation optical system including a first dichroic mirror configured to separate outgoing light emitted from the light source into a first colored light beam in a first wavelength band including blue light and another colored light beam longer in wavelength band than the first colored light beam, and to reflect the first colored light beam toward a direction perpendicular to an optical axis of the outgoing light;
a first light modulation element configured to perform a modulation on the first colored light beam separated by the first dichroic mirror;
a second light modulation element configured to perform a modulation on the other colored light beam separated by the first dichroic mirror;
a reflecting mirror configured to reflect the first colored light beam separated by the first dichroic mirror, in a perpendicular direction toward the first light modulation element;
a reduction optical system having an expansion side imaging plane on which the first light modulation element is disposed, and configured to reduce a luminous flux width of the first colored light beam on a reduction side imaging plane, the first colored light beam being modulated by the first light modulation element;
a color combining prism configured to emit a composite light beam obtained by combining the first colored light beam a luminous flux width of which is reduced by the reduction optical system, and the other colored light beam modulated by the second light modulation element with each other; and
a projection optical system configured to project the composite light beam emitted from the color combining prism, wherein
an effective area of the first light modulation element is larger than an effective area of the second light modulation element,
an optical axis of the first light modulation element is parallel to an optical axis of the reduction side imaging plane,
an incident direction of the first colored light beam entering the first light modulation element is an opposite direction to an exit direction of the first colored light beam emitted from the reduction side imaging plane, and
the reduction side imaging plane is at a position opposed to a first surface part of the color combining prism which the first colored light beam enters.
2. The projector according to claim 1, further comprising:
a polarization plate arranged between the reduction side imaging plane and the first surface part.
3. The projector according to claim 1, further comprising:
a relay lens arranged between the first dichroic mirror and the reflecting mirror.
4. The projector according to claim 1, wherein
the separation optical system includes a second dichroic mirror configured to separate the other colored light beam which is transmitted by the first dichroic mirror toward a first direction of the optical axis, into a second colored light beam in a second wavelength band including green, and a third colored light beam in a third wavelength band including red,
the second light modulation element includes a third light modulation element configured to perform a modulation on the second colored light beam separated by the second dichroic mirror, and a fourth light modulation element configured to perform a modulation on the third colored light beam separated by the second dichroic mirror, and
the color combining prism is configured to emit a composite light beam obtained by combining the first colored light beam the luminous flux width of which is reduced by the reduction optical system, the second colored light beam modulated by the third light modulation element, and the third colored light beam modulated by the fourth light modulation element with each other.
5. The projector according to claim 4, wherein
the first colored light beam entering the first surface part of the color combining prism, the second colored light beam entering a second surface part of the color combining prism, and the third colored light beam entering a third surface part of the color combining prism are same in flux width as each other.
6. The projector according to claim 1, wherein
the reduction optical system includes a plurality of reflecting surfaces having power, and
both sides of the reduction optical system are each telecentric.
7. The projector according to claim 1, wherein
the reduction optical system includes a first lens group, a second lens group, and a third lens group in this order from an expansion side toward a reduction side, wherein the first lens group is formed of a plurality of lenses, and has positive power, the second lens group has negative power, and has a single lens or two lenses at least one of which is a lens having negative power, and the third lens group is formed of a plurality of lenses, and has positive power, the first lens group and the third lens group are same in number of lenses as each other, and both sides of the reduction optical system are each telecentric.

\*　\*　\*　\*　\*